UNITED STATES PATENT OFFICE.

JOHN W. HYATT, OF NEWARK, NEW JERSEY, ASSIGNOR TO THE HYATT PURE WATER COMPANY, OF SAME PLACE.

FILTERING MEDIUM.

SPECIFICATION forming part of Letters Patent No. 369,716, dated September 13, 1887.

Application filed December 15, 1886. Serial No. 221,678. (No specimens.)

*To all whom it may concern:*

Be it known that I, JOHN W. HYATT, a citizen of the United States, residing at Newark, Essex county, New Jersey, have invented certain new and useful Improvements in Filtering Mediums, fully described in the following specification.

This invention consists partly in an improved mode of preparing hydraulic cement for use in forming a porous filtering medium, and partly in the medium thus obtained and the method of closing its pores.

Hydraulic cement, when mixed with water and permitted to set or harden, is usually impervious to moisture; and the first part of my invention consists in the discovery that hydraulic cement consists partly of coarse and partly of impalpable particles, and that the impenetrability of the cement is due to the filling of the pores, which would otherwise exist by the finer particles. I have also discovered that when the finer particles are removed by sifting or subsidence in water the coarser particles alone will set and harden with equal efficacy, and will form a porous stone of great fineness and value for filtering purposes. The facility with which the cement, when thus prepared, may be molded into disks, plates, or tubes adapted for filtering purposes renders my discovery of great use in adapting such material to the purpose of filtering. The particles which it is requisite to remove from the cement are fine like wheat-flour, and may be most effectively separated from the coarser particles by agitating the entire mass of the cement in water and floating the finer particles away from the surface of the fluid by a gentle current. Such method is well known, as it has already been used in grading emery and other polishing-powders, and therefore needs no further description here.

In utilizing my invention in the formation of a filtering medium in any desired shape, it is necessary, if the finer particles be removed by subsidence in water, to treat only such quantity of the cement as may be immediately used, as it is obvious that the wetting of the cement will cause it to harden when removed from the water used in washing. The finer particles may be separated from the coarser by bolting in a screen of suitable fineness. However prepared, the cement requires to be wet with water and soon molded into the desired form, in which it will then harden and retain its shape as required.

For some purposes it may be desirable to mix fine sand with such prepared cement. Where the prepared cement presents, after setting, interstices of too coarse a character, such defect may be rectified by the application of pressure to the substance during the acting of setting, such pressure serving to force the particles into somewhat closer contact, and thereby producing a filtering medium of higher power. To apply such pressure uniformly to the surface of the article into which the cement is molded, I prefer to cover the entire surface of the article with a yielding and water-proof material, as india-rubber, and then apply hydraulic pressure in the required degree to consolidate the article. To apply such pressure the article and its covering would simply be immersed in a tight vessel supplied with water under the desired pressure, as twenty to fifty pounds per square inch.

Where the prepared cement is molded into flat plates to form filtering-diaphragms, it is obvious that screw-pressure or its equivalent may be readily applied to their flat surfaces.

Having thus set forth the nature of my invention, what I claim herein is—

1. Hydraulic cement having its finer particles removed for use in forming a porous substance when mixed with water and hardened, substantially as herein set forth.

2. The method herein shown and described of forming a porous filtering medium of hydraulic cement, consisting, first, in separating the fine particles from the cement, and, secondly, shaping the cement with the addition of water into the desired form, substantially as set forth.

3. A filtering medium composed of hydraulic cement having its finer particles removed, as and for the purpose set forth.

4. The method herein shown and described of forming a porous filtering medium of hydraulic cement, consisting, first, in separating the finer particles from the cement; secondly, shaping the cement with the addition of water into the desired form, and, thirdly, in subjecting the article thus formed to pressure during the operation of setting or hardening, as and for the purpose set forth.

In testimony whereof I have hereunto set my hand in the presence of two subscribing witnesses.

JOHN W. HYATT.

Witnesses:
　THOS. S. CRANE,
　L. LEE.